United States Patent
Tasher et al.

(10) Patent No.: US 9,471,413 B2
(45) Date of Patent: Oct. 18, 2016

(54) MEMORY DEVICE WITH SECURE TEST MODE

(71) Applicant: Winbond Electronics Corporation, Zhubei (TW)

(72) Inventors: Nir Tasher, Tel Mond (IL); Uri Kaluzhny, Beit Shemesh (IL); Tsachi Weiser, Even Yehuda (IL); Valery Teper, Petach Tikva (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 0 days.

(21) Appl. No.: 15/004,957

(22) Filed: Jan. 24, 2016

(65) Prior Publication Data
US 2016/0139976 A1 May 19, 2016

Related U.S. Application Data

(62) Division of application No. 14/244,000, filed on Apr. 3, 2014.

(51) Int. Cl.
| | | |
|---|---|---|
| G11C 29/00 | (2006.01) | |
| G06F 11/07 | (2006.01) | |
| G11C 29/38 | (2006.01) | |
| G06F 21/79 | (2013.01) | |
| G11C 7/24 | (2006.01) | |
| G11C 29/12 | (2006.01) | |
| G06F 11/26 | (2006.01) | |

(52) U.S. Cl.
CPC ......... *G06F 11/0769* (2013.01); *G06F 11/073* (2013.01); *G06F 11/26* (2013.01); *G06F 21/79* (2013.01); *G11C 7/24* (2013.01); *G11C 29/12* (2013.01); *G11C 29/38* (2013.01)

(58) Field of Classification Search
CPC ........... G06F 21/44; G06F 2221/2129; G06F 11/3495; G06F 11/348; G06F 21/10; H04L 9/0869; H04L 9/0877; H04L 9/3234; H04L 9/32; H04L 63/061
See application file for complete search history.

(56) References Cited

U.S. PATENT DOCUMENTS

| | | | |
|---|---|---|---|
| 6,272,637 B1 | 8/2001 | Little et al. | |
| 7,082,539 B1 | 7/2006 | Kitahara et al. | |
| 7,739,565 B1 * | 6/2010 | Lesea | G06F 11/1004 714/725 |
| 8,312,294 B2 * | 11/2012 | Sato | G06F 21/10 713/193 |
| 8,427,194 B2 | 4/2013 | Deas et al. | |
| 8,832,455 B1 * | 9/2014 | Drewry | G06F 21/575 713/187 |

(Continued)

FOREIGN PATENT DOCUMENTS

EP     2566096 A2     3/2013

OTHER PUBLICATIONS

KR Application # 10-2014-0125216 Office Action dated Feb. 16, 2016.

(Continued)

*Primary Examiner* — Guerrier Merant
(74) *Attorney, Agent, or Firm* — D. Kliger IP Services Ltd.

(57) ABSTRACT

A method in a memory device that operates in a testing mode, includes receiving a vector to be written to the memory device. The vector is written to the memory device only if the vector belongs to a predefined set of test vectors. If the vector does not belong to the set of test vectors, the vector is converted to one of the test vectors, and the converted vector is written to the memory device.

8 Claims, 3 Drawing Sheets

(56) References Cited

U.S. PATENT DOCUMENTS

| | | |
|---|---|---|
| 2002/0164022 A1 | 11/2002 | Strasser et al. |
| 2003/0005453 A1 | 1/2003 | Rodriguez et al. |
| 2004/0260932 A1 | 12/2004 | Blangy et al. |
| 2005/0024922 A1 | 2/2005 | Li et al. |
| 2005/0039035 A1* | 2/2005 | Clowes ................ G06F 21/121 713/193 |
| 2005/0058285 A1 | 3/2005 | Stein et al. |
| 2005/0123135 A1 | 6/2005 | Hunt et al. |
| 2006/0059553 A1 | 3/2006 | Morais et al. |
| 2007/0133437 A1 | 6/2007 | Wengrovitz et al. |
| 2007/0192592 A1 | 8/2007 | Goettfert et al. |
| 2009/0217377 A1* | 8/2009 | Arbaugh ............ G06F 11/3495 726/23 |
| 2009/0327633 A1* | 12/2009 | Fusella .................. G06F 21/79 711/163 |
| 2010/0146190 A1* | 6/2010 | Chang .................. G06F 21/572 711/103 |
| 2010/0158242 A1* | 6/2010 | Asher .................. H04L 9/0643 380/28 |
| 2011/0185435 A1* | 7/2011 | Chang .................... G06F 12/14 726/27 |
| 2011/0285421 A1 | 11/2011 | Deas et al. |
| 2012/0204056 A1 | 8/2012 | Airaud et al. |
| 2013/0145177 A1 | 6/2013 | Cordella et al. |
| 2013/0339730 A1* | 12/2013 | Nagai .................. H04L 9/0877 713/168 |
| 2013/0339744 A1* | 12/2013 | Nagai .................... G06F 21/10 713/182 |
| 2014/0281564 A1* | 9/2014 | Nagai .................. G06F 21/445 713/185 |
| 2015/0074406 A1* | 3/2015 | Nagai .................... G06F 21/44 713/171 |

OTHER PUBLICATIONS

US Appl. No. 14/301,456 Office Action dated Dec. 22, 2015.
U.S. Appl. No. 13/965,256 Office Action dated Jun. 27, 2016.
U.S. Appl. No. 14/702,791 Office Action dated Jun. 16, 2016.
Zhuang, H.,"HIDE: An Infrastructure for Efficiently Protecting Information Leakage on the Address Bus", Proceedings of the 11th international conference on Architectural support for programming languages and operating systems (ASPLOS'04), pp. 72-84, Boston, USA, Oct. 9-13, 2004.

* cited by examiner

MEMORY DEVICE WITH SECURE TEST MODE

FIELD OF THE INVENTION

The present invention relates generally to secured memory, and particularly to methods and systems for securing a memory device in test mode.

BACKGROUND OF THE INVENTION

Some secured memory devices encrypt the stored data using a secret key. Secured memory devices may be vulnerable to various attacks intended to access or to modify sensitive stored information, and/or to disrupt the operation of the memory device.

SUMMARY OF THE INVENTION

A method in a memory device that operates in a testing mode, includes receiving a vector to be written to the memory device. The vector is written to the memory device only if the vector belongs to a predefined set of test vectors. If the vector does not belong to the set of test vectors, the vector is converted to one of the test vectors, and the converted vector is written to the memory device.

In some embodiments, converting the vector into one of the test vectors includes selecting a subset of bits of the vector, and replacing remaining bits of the vector with periodic replications of the selected subset. In other embodiments, in any of the test vectors all the even-order bits equal a first bit value and all the odd-order bits equal a second bit value, and converting the vector includes selecting, in the vector, a representative even bit and a representative odd bit, replacing the even-order bits of the vector with the representative even bit, and replacing the odd-order bits of the vector with the representative odd bit.

In an embodiment, testing the memory includes reading a data word of a previously written test vector, and exposing outside the memory device encoded information about errors in the read data word. In another embodiment, exposing the encoded information includes exposing a total number of the errors. In yet another embodiment, exposing the encoded information includes not exposing true locations of the errors.

In some embodiments, not exposing the true locations of the errors includes shifting even-order and odd-order bits that indicate errors to different respective even-order or odd-order locations. In other embodiments, exposing the encoded information includes further exposing a true location of a subset of the errors.

There is additionally provided, in accordance with an embodiment of the present invention, a memory device including a memory and a memory controller. The memory controller is configured to operate in a testing mode, to receive a vector to be written to the memory, to write the vector to the memory only if the vector belongs to a predefined set of test vectors, and, if the vector does not belong to the set of test vectors, to convert the vector to one of the test vectors, and to write the converted vector to the memory.

There is additionally provided, in accordance with an embodiment of the present invention, a method in a memory device, including reading in a testing mode one or more words from the memory device. A result of a one-way function that is applied to the one or more words is calculated, such that none of the one or more words can be recovered from the result. Encoded information on errors in the one or more words, which is based on the calculated result, is output.

In some embodiments, reading the one or more words includes receiving an expected result of the one-way function applied to at least a subset of the one or more words when stored, and calculating the result includes applying the one-way function to the subset of the one or more words when read. In other embodiments, outputting the encoded information includes outputting a binary result of a comparison between the expected result and the calculated result. In yet other embodiments, receiving the expected result includes receiving the expected result a multiple number of times, and if the number of times exceeds a predefined threshold, taking a protective measure.

There is additionally provided, in accordance with an embodiment of the present invention, a memory device including a memory and a memory controller. The memory controller is configured to read in a testing mode one or more words from the memory, to calculate a result of a one-way function applied to the one or more words, such that none of the one or more words can be recovered from the result, and to output encoded information on errors in the one or more words, based on the calculated result.

There is additionally provided, in accordance with an embodiment of the present invention, a method in a memory device, including checking whether a secret key is installed. Upon detecting that the secret key is installed, a testing mode of the memory device is disabled until erasing at least the secret key from the memory device.

In some embodiments, the secret key is installed in a memory of the memory device, and removing at least the secret key includes erasing the entire memory of the memory device.

There is additionally provided, in accordance with an embodiment of the present invention, a memory device including a memory and a memory controller. The memory controller is configured to check whether a secret key is installed, and upon detecting that the secret key is installed, to disable a testing mode of the memory device until erasing at least the secret key from the memory.

The present invention will be more fully understood from the following detailed description of the embodiments thereof, taken together with the drawings in which:

DETAILED DESCRIPTION OF EMBODIMENTS

Overview

Figure 1:
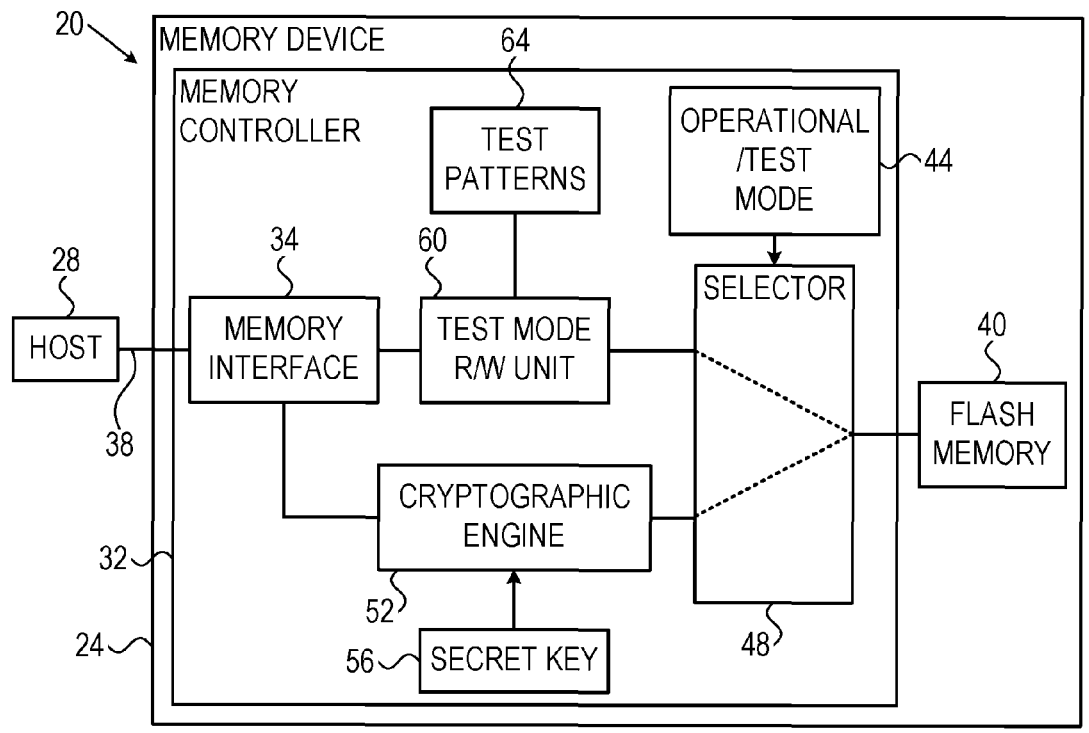
FIG. 1 is a block diagram that schematically illustrates a system for testing a memory device, in accordance with an embodiment of the present invention.

Embodiments of the present invention that are described herein provide improved methods and systems for securing memory device against attacks that try to exploit the memory device's test mode. In test mode, test patterns are typically stored and read back unencrypted, so as to ease the interpretation of the test results. Although typically only authorized testers are permitted to test a memory device, unauthorized parties may try to access or modify stored data, disrupt the operation of the memory device, or otherwise attack the memory device, by exploiting vulnerabilities of the device's test mode. In the description that follows we assume that the memory device communicates with an external host (e.g., tester) over an unsecured link.

In some embodiments, the test mode specifies a small set of predefined test patterns (also referred to herein as test vectors). When operating in test mode, the memory device allows writing to the memory array only data words that belong to the set of predefined valid patterns. Moreover, when receiving a data word that does not belong to the set of test patterns, the memory device converts the data word into one of the predefined test patterns before storage. By allowing writing to the memory device under test limited patterns rather than meaningful data, the security of the device improves significantly.

In some embodiments, the memory device reads from the memory a previously written test pattern, which possibly contains one or more errors. The memory device converts the read pattern into one of the valid patterns and compares the result to the read pattern, so as to generate a word of erroneous bits. The memory device then manipulates the word of erroneous bits in order to disguise the exact error locations, but on the other hand give the tester meaningful information for testing and debugging. This manipulation may involve, for example, shifting the erroneous bits to other bit locations. In other words, the memory device tracks the number of errors, but disguises the true locations of the errors. In an embodiment, the memory device additionally encodes the number of errors and the location of the most significant erroneous bit.

In some embodiments, the host writes testing data to a given memory area (not necessarily a contiguous area). The host additionally provides the memory device with an expected result of a one-way function applied to the data stored in this memory area. The one-way function is defined such that recovering any of the data words in the memory area from the result is infeasible. To test the integrity of the memory area, the memory device re-calculates the result of the one-way function and compares the re-calculated result to the expected result provided by the host.

Any difference between the expected and re-calculated results indicates that the data read from the memory area contains one or more errors. The memory device outputs only the binary outcome of the comparison, thus exposing only essential information. This testing scheme enables to test the integrity of the data written, but makes it infeasible to guess the data itself.

In some embodiments, the memory device provides protection from an attack that attempts to guess the memory content by sending multiple different versions of the one-way function result. The memory device counts the number of times the device receives such expected result, and if this number exceeds a predefined threshold, the device disables the testing mode, or takes any other suitable protective measures.

In an embodiment, the memory device disables testing of the memory upon detecting that one or more secret keys are installed. The secret keys may be used, for example, for encryption and/or authentication. On the other hand, when the secret keys are not installed, the device cannot carry out encryption and/or authentication operations. Thus, when a secret key is installed, the memory device disables writing, reading or both, non-encrypted data to/from the memory, e.g., for the purpose of testing. In this embodiment, to enable testing, the memory device first erases the entire memory, including any installed secret key. Alternatively, the memory device removes only the secret keys and any other secret information from the memory.

The disclosed techniques enable to securely test a memory device in various ways, such as by limiting the data that can be written to a small set of test patterns, by exposing only encoded and limited information about testing results, and by enabling memory testing only after erasure of any secret keys and/or secret data.

System Description

FIG. 1 is a block diagram that schematically illustrates a system 20 for testing a memory device 24, in accordance with an embodiment of the present invention. System 20 comprises a host 28, which writes data and/or commands to memory device 24, and reads data and/or test results from the memory device. Memory device comprises a memory controller 32, which communicates with host 28 using a memory interface 34 over an unsecured link 38.

Memory device 24 further comprises a non-volatile memory 40 that stores data received from memory controller 32 for storage, and retrieves the stored data for memory controller 32 upon request. In the embodiment of FIG. 1, memory 40 comprises Flash memory. In alternative embodiments, any other suitable non-volatile memory of any suitable technology can be used, such as, for example, Solid State Drive (SDD) based, EEPROM, one time programmable (OTP) ROM, Resistive-RAM (RRAM), magnetic storage such as a Hard Disk Drive (HDD), optical storage, and the like. In the description that follows, we assume that memory 40 comprises a Flash memory, as a representative example of a non-volatile memory, but the disclosed techniques are applicable to any other suitable memory.

A mode configuration unit 44 configures memory device 24 to operate in one of two operating modes, referred to herein as operational and testing modes. Although the testing mode is typically restricted to authorized users, unauthorized attackers may force the device into the testing mode of operation.

When in operational mode, memory controller 32 may apply cryptographic operations to the data to be stored in Flash memory 40, and to data retrieved from the Flash memory, using a cryptographic engine 52. When in operational mode, a selector 48 interconnects between engine 52 and Flash memory 40. In some embodiments, engine 52 encrypts the data before storing, and decrypts the data read from the Flash memory.

Alternatively or additionally, engine 52 calculates a cryptographic signature of the data, and stores the signature along with the data in Flash memory 40. When the data is retrieved, engine 52 can validate the integrity of the data by calculating the signature of the read data and comparing to the stored signature. A secret key unit 56 holds one or more secret keys to be used by cryptographic engine 52.

When operating in testing mode, memory device 32 configures selector 48 to interconnect a test Read/Write (R/W) unit 60 to Flash memory 40 instead of cryptographic engine 52. Therefore, in testing mode, the information that can be exchanged between the Flash memory and the host is controlled by test R/W unit 60.

In some embodiments, when writing data to the Flash memory in testing mode, R/W unit 60 can write to the Flash memory only data words that belong to a small set of predefined test patterns 64. Moreover, R/W unit 60 converts any data received from interface 34 that does not match any of patterns 64 into one of the allowed test patterns. As a result, an unauthorized user cannot write meaningful information to the Flash memory, and therefore cannot modify sensitive information that is stored in the Flash memory.

When memory device 24 is in testing mode, and reads data from Flash memory 40, R/W unit 60 checks for errors in the retrieved data. R/W unit 60 encodes the information regarding the errors, so that only essential information about the errors is exposed, and delivers the encoded information to host 28 via interface 34, thus exposing only minimal and essential information over unsecured link 38.

In some embodiments, the testing of memory device 24 is based on calculating a result of a one-way function over some data that is stored in the Flash memory. The term "one-way function" refers to a function that meets two criteria: (i) A change in the data causes a change in the result of the function with very high probability, and (ii) the data cannot be recovered from the result.

The implementation of the one-way function is typically done within R/W unit 60, but may alternatively be part of cryptographic engine 52, or divided between the two. When the host stores data in the memory device, R/W unit 60 stores along the data and returns to the host the result of the one-way function applied to that data. Alternatively, the host comprises means to calculate the respective one-way function outcome and store the result in a local memory of the host.

When testing, the host provides R/W unit 60 with the expected result of the one-way function and upon reading the data back, R/W unit 60 re-calculates the one-way function over the read data and compares to the expected result. If the two results match, the data is assumed to be read correctly, with high probability. R/W unit 60 can output to host 28 only the comparison outcome, or the re-calculated result of the one-way function.

In some embodiments, R/W unit 60 additionally keeps track of the number of times the R/W unit receives an expected result of the one-way function, to be compared with the re-calculated result. When the tracked number of times exceeds a predefined threshold, this may indicate of a brute force attack, and the device may protect from such an attack by disabling the test mode of the memory device, or by taking any other suitable protecting measures.

In some embodiments, R/W unit 60 comprises means to detect whether secret key 56 is installed, or not, and can disable testing the memory until the secret key and/or other sensitive information are erased, as explained, in an embodiment, further below.

The configuration of memory device 24 in FIG. 1 is an example configuration, which is chosen purely for the sake of conceptual clarity. In alternative embodiments, any other suitable configuration of a memory device can also be used. The different elements of device 24, such as R/W unit 60 and cryptographic engine 52, may be implemented using any suitable hardware, such as in an Application-Specific Integrated Circuit (ASIC) or Field-Programmable Gate Array (FPGA). In some embodiments, some elements of device 24 can be implemented using software, or using a combination of hardware and software elements.

In some embodiments, certain elements of system 20, such as host 28 or elements of memory controller 32, may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Secured Testing of the Memory

Figure 2:
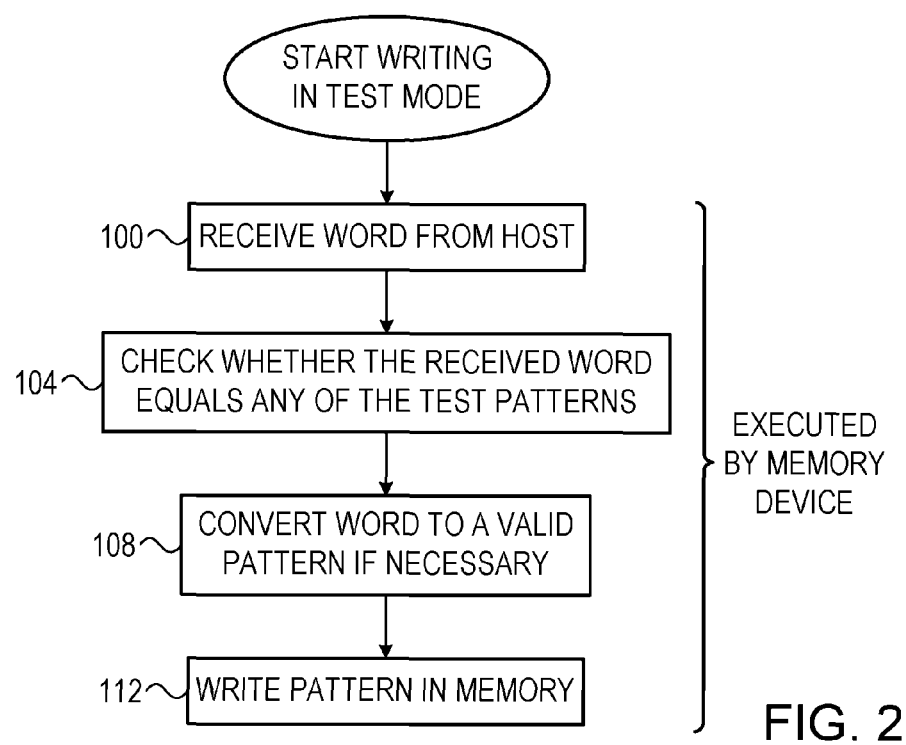
FIG. 2 is a flow chart that schematically illustrates a method for securely writing test patterns, in accordance with an embodiment of the present invention.

FIG. 2 is a flow chart that schematically illustrates a method for securely writing test patterns, in accordance with an embodiment of the present invention. In the method of FIG. 2, we assume that the memory device operates in testing mode. We further assume that Flash memory 40 stores 32-bit data elements, and that test patterns 64 comprise four 32-bit patterns, whose values are depicted in Table 1 below. In any of the test patterns in Table 1, all the bits in the even bit positions have a first bit value, and all the bits in the odd bit positions have a second bit value.

TABLE 1

Valid test patterns

| Pattern ID | Binary value (32 bits) | Hexadecimal value |
|---|---|---|
| 0 | 00000000000000000000000000000000 | 0x00000000 |
| 1 | 01010101010101010101010101010101 | 0x55555555 |
| 2 | 10101010101010101010101010101010 | 0xAAAAAAAA |
| 3 | 11111111111111111111111111111111 | 0xFFFFFFFF |

The method begins at a reception step 100, with R/W unit 60 receiving from host 28 a data word to be written. In testing mode, the data word should typically belong to test patterns 64 (e.g., the data word equals one of the patterns in Table 1 above). In alternative embodiments, instead of receiving the data words directly, the R/W unit receives from the host a command that includes the data word to be written.

At a checking step 104, R/W unit 60 checks whether the received data word matches any of test patterns 64. If the data word differs from all the valid test patterns, the R/W unit converts the data word into a valid test pattern at a conversion step 108. Otherwise, the R/W unit leaves the data word unchanged. Note that in both cases the R/W unit outputs a valid test pattern. In some embodiments, when the received data word does not match any of the test patterns, the memory device ignores the data word or the command that includes this data word.

R/W unit 60 can use any suitable method for converting the received data word into a valid pattern. In some embodiments, to perform the conversion, the R/W unit first selects a representative even bit and a representative odd bit among the 32 bits of the received data word. The R/W unit can select any suitable even and odd representative bits, such as, for example, the two Most Significant (MS) bits, or the two Least Significant (LS) bits of the received data word. Then the R/W unit converts the received data word into a valid test pattern, by replacing the even-order bits with the even representative bit, and the odd-ordered bits with the odd representative bit. Generally speaking, the R/W unit may convert the received data word into a valid pattern by selecting any suitable subset of bits of the data word, and replacing the remaining bits of the data word with periodic replications of the selected subset.

In one embodiment, at step 108, R/W unit 60 converts the data word into a valid pattern by duplicating the binary value of the two Most Significant (MS) bits, fifteen times. For example, the R/W unit converts the 32-bit data word 00XX . . . XXXX in which X denotes a binary value that may be '0' or '1', to the pattern 0x00000000, and the word 01XX . . . XXXX to the pattern 0x55555555 (binary "0101 . . . 01010101").

At a storing step 112, R/W unit 60 writes the output of step 108, which as explained above equals a valid test pattern, to Flash memory 40, and the method then terminates.

The writing scheme described in FIG. 2 prevents an unauthorized user from writing meaningful information to the memory in attempt to read or to manipulate secured information or to cause other damage to the device.

Figure 3:
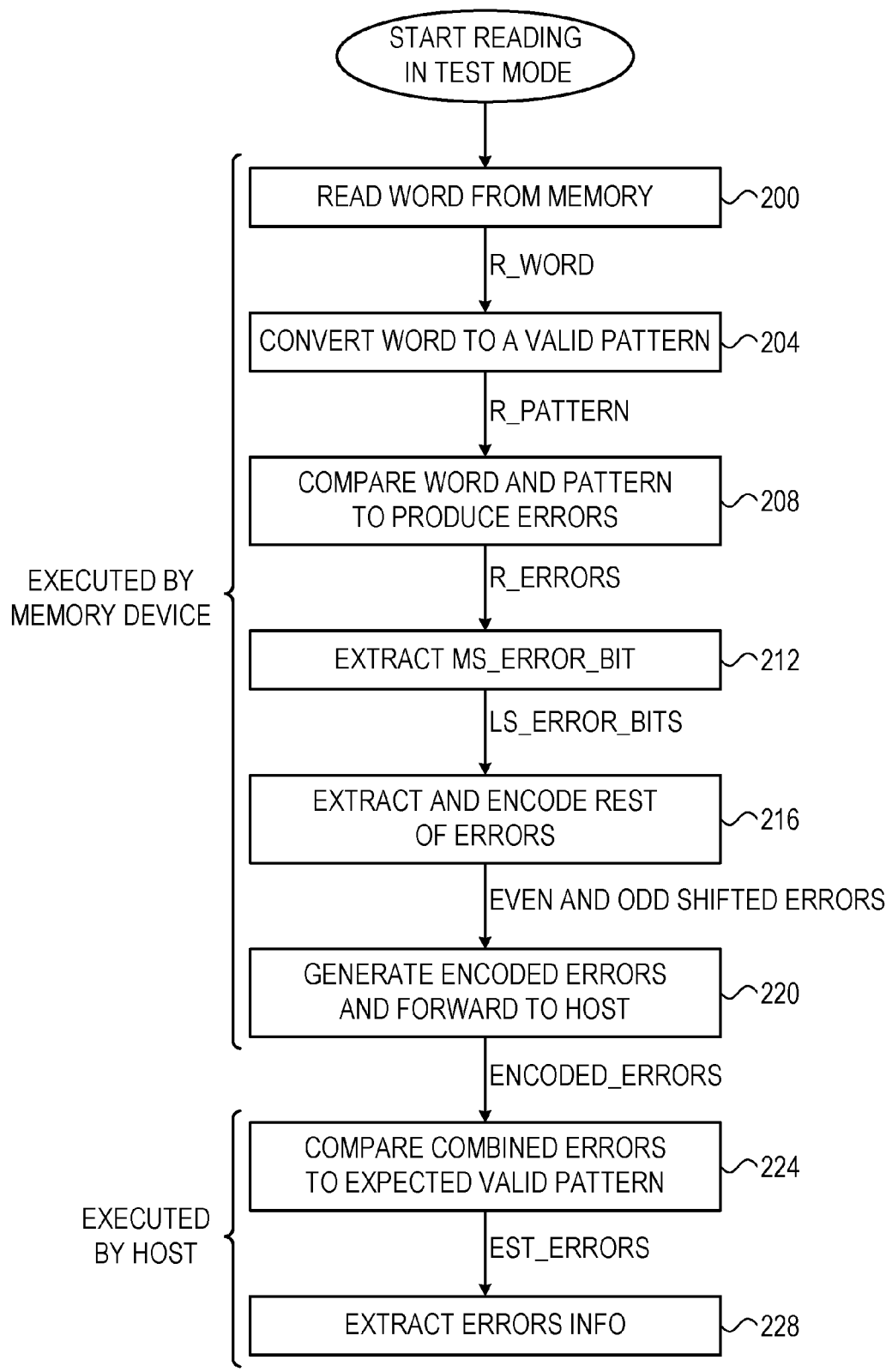
FIG. 3 is a flow chart that schematically illustrates a method for testing a memory device, in accordance with an embodiment of the present invention.

FIG. 3 is a flow chart that schematically illustrates a method for testing a memory device, in accordance with an embodiment of the present invention. The method can be carried out, for example, after writing the memory using the method of FIG. 2 above, or independently of the method of FIG. 2. The description of FIG. 3 is accompanied with a numerical example in which the pattern 0x55555555 (binary "0101 . . . 01010101") is previously written to the Flash memory. Additional respective numerical results that correspond to various steps in the flow chart are depicted in Table 2 below.

The method begins by R/W unit 60 reading a word that is stored in Flash memory 40, at a reading step 200. In some embodiments, the R/W unit executes step 200 in response to receiving a respective command (not shown) from the host, to read one or more locations in the memory. Any of the 32 bits of the word read at step 200 may be correct or erroneous. In the example of Table 2, we assume that the read word contains 21 errors, and instead of reading the previously written pattern 0x55555555, R/W unit 60 reads R_WORD=0x93209A6A.

At a read conversion step 204, R/W unit 60 converts R_WORD to one of test patterns 64. In an embodiment, the conversion is similar to the check and conditional conversion operations described at respective steps 104 and 108 above. In the example of Table 2, the two MS bits of R_WORD equal '10' and therefore R_WORD is converted to the pattern R_PATTERN=0xAAAAAAAA.

At an errors extraction step 208, the R/W unit compares between R_WORD and R_PATTERN, using a 32-bit bitwise XOR operation, which result in a 32-bit word of errors, denoted R_ERRORS. Note that when R_WORD contains no errors, R_ERRORS equals a zero word.

At an MS error bit extraction step 212, R/W unit extracts a 32-bit word, denoted MS_ERROR_BIT, and which contains a single '1' bit at the position of the MS erroneous bit of R_ERRORS. For example, R/W unit 60 can clear the entire MS_ERROR_BIT_word, and then set a '1' bit at the position of leftmost non-zero bit found in R_ERRORS. In the example of Table 2, MS_ERROR_BIT=0x20000000. In some embodiments, R/W unit 60 does not provide explicit information about the MS error bit, and step 212 may be omitted.

Further at step 212, R/W unit 60 extracts a 32-bit word that contains the Least Significant (LS) error bits (if any), and that is denoted LS_ERROR_BITS. LS_ERROR_BITS equals R_ERRORS excluding the MS error bit (e.g., calculated by a bitwise XOR operation between R_ERRORS and MS_ERROR_BIT). In the example of Table 2, LS_ERROR_BITS=0x198A30C0;

At an error encoding step 216, R/W unit 60 encodes the errors in LS_ERROR_BITS in a 32-bit word, from which the total number of errors can be concluded, but the true locations of the erroneous bits are not exposed. R/W unit separately processes bits in the even and odd locations of LS_ERROR_BITS as described herein. In the description that follows, even and odd '1' bits refer to '1' bits whose bit position or location in the 32-bit word is even or odd, respectively.

To process the even '1' bits at step 216, the R/W unit moves the even '1' bits in LS_ERROR_BITS to the rightmost even locations that are available (i.e., are cleared). The result of this operation is denoted EVN_SHIFT_ERRORS and has the form 000 . . . 010101, in which the number of ones equals the number of even '1' bits in LS_ERROR_ BITS. In the example of Table 2, LS_ERROR_BITS contains four even '1' bits, and therefore EVN_SHIFT_ERRORS=0x00000055.

Similarly, to process the odd '1' bits, the R/W unit moves the odd '1' bits in LS_ERROR_BITS to the rightmost available odd locations. The result of this operation is denoted ODD_SHIFT_ERRORS, and has the form 000 . . . 101010, in which the number of ones equals the number of odd '1' bits in LS_ERROR_BITS. In the example of Table 2, there are six odd '1' bits in LS_ERROR_BITS and therefore ODD_SHIFT_ERRORS=0x00000AAA.

Note that the words EVN_SHIFT_ERRORS and ODD_SHIFT_ERRORS convey information about the number of errors, but from which the true locations of the errors cannot be recovered.

At an error encoding step 220, R/W unit 60 combines the MS error bit MS_ERROR_BIT of step 212, the even and odd shifted errors EVN_SHIFT_ERRORS and ODD_SHIFT_ERRORS of step 216, and the pattern R_PATTERN of step 204, to produce ENCODED_ERRORS. In some embodiments, the combining operation at step 220 comprises a bitwise XOR operation among R_PATTERN, MS_BIT_ERROR, EVEN_SHIFTED_ERRORS, and ODD_SHIFTED_ERRORS. In the example of Table 2 ENCODED_ERRORS=0x8AAAA055. The memory device then delivers ENCODED_ERRORS of step 220 to host 28.

In the embodiment described above, R/W unit 60 applies bitwise XOR with R_PATTERN twice: firstly at step 208 when extracting the errors, and secondly at step 220 when encoding the errors. In addition, between applying the two XOR operations, even and odd '1' bits are repositioned to other respective even and odd locations. Note that if two MS bits in R_WORD contain errors, the R_PATTERN value differs from the true pattern value that was stored. In this case, the roles of the erroneous and correct bits in R_ERRORS are switched (i.e., zeros indicate the erroneous bits, and ones indicate the correct bits), but the XOR operation at step 220 switches these roles back in order.

In the embodiment described above, the R/W unit retains the location of the MS error bit, and shifts the LS bit errors to the rightmost available locations. This scheme thus retains the position of the MS error bit, but for the LS error bits, the R/W unit outputs the number of the errors without exposing their true locations.

The following described steps are executed by host after receiving, from the memory device, the result ENCODED_ERRORS of step 220 above. At a comparison step 224, the host compares between ENCODED_ERRORS and the expected test pattern (W_PATTERN). The host can perform the comparison using a bitwise XOR operation between ENCODED_ERRORS and W_PATTERN. The comparison result is denoted EST_ERRORS, and in the example of Table 2, EST_ERRORS=0xDFFFF500.

At an errors decoding step 228, the host extracts from EST_ERRORS information about the respective readout errors. In the present embodiment, the host extracts the exact location of the MS error, and the total number of errors. In the example of Table 2, the MS error is located at the leftmost position, and there are 21 errors in total.

TABLE 2

A numerical example to clarify the method of FIG. 3

| 32-bit word | Binary value | Hex value |
| --- | --- | --- |
| W_PATTERN | 01010101010101010101010101010101 | 0x55555555 |
| R_WORD | 10010011001000001001101001101010 | 0x93209A6A |
| R_PATTERN | 10101010101010101010101010101010 | 0xAAAAAAAA |
| R_ERRORS | 00111001100010100011000011000000 | 0x398A30C0 |

TABLE 2-continued

A numerical example to clarify the method of FIG. 3

| 32-bit word | Binary value | Hex value |
| --- | --- | --- |
| MS_ERROR_BIT | 00100000000000000000000000000000 | 0x20000000 |
| LS_ERROR_BITS | 00011001100010100011000011000000 | 0x198A30C0 |
| EVN_SHIFT_ERRORS | 00000000000000000000000001010101 | 0x00000055 |
| ODD_SHIFT_ERRORS | 00000000000000000000101010101010 | 0x00000AAA |
| ENCODED_ERRORS | 10001010101010101000001010101 | 0x8AAAA055 |
| Expected pattern | 01010101010101010101010101010101 | 0x55555555 |
| EST_ERRORS | 11011111111111111111010100000000 | 0xDFFFF500 |
| Total errors | 21 | |
| MS Error bit | 10000000000000000000000000000000 | |

The testing configuration described in FIG. 3 is exemplary, and other testing configurations can also be used. For example, in some embodiments, the host sends the expected pattern to the memory device, which compares the pattern to the stored value, and returns to the host encoded information about reading errors, if any.

In the disclosed embodiments, the encoded information regarding the readout errors includes the exact location of the MS error, and the total number of errors. In alternative embodiments, the information includes only the location of the MS error, or the total number of errors. Further alternatively, the errors information may include the location of other than the MS error (e.g., the location of the LS error), and/or the locations of multiple errors.

The disclosed embodiment is implemented using four test patterns as depicted in Table 1 above. In alternative embodiments, however, any other suitable set of valid patterns can be used. For example, the number of patterns may be other than four. As another example, the values of the patterns may be different from the patterns in Table 1 above.

In the method of FIG. 3, erroneous bits are shifted to rightmost even or odd available positions. Alternatively or additionally, erroneous bits can be shifted to available even or odd positions other than the rightmost such positions. For example, if a single error occurs at the LS bit position, this error bit can be repositioned in any other odd bit position.

Although the method of FIG. 3 describes testing a memory whose word data size is 32 bits, the method is applicable to any other suitable word size.

Secured Test Based on One-Way Function

Figure 4:
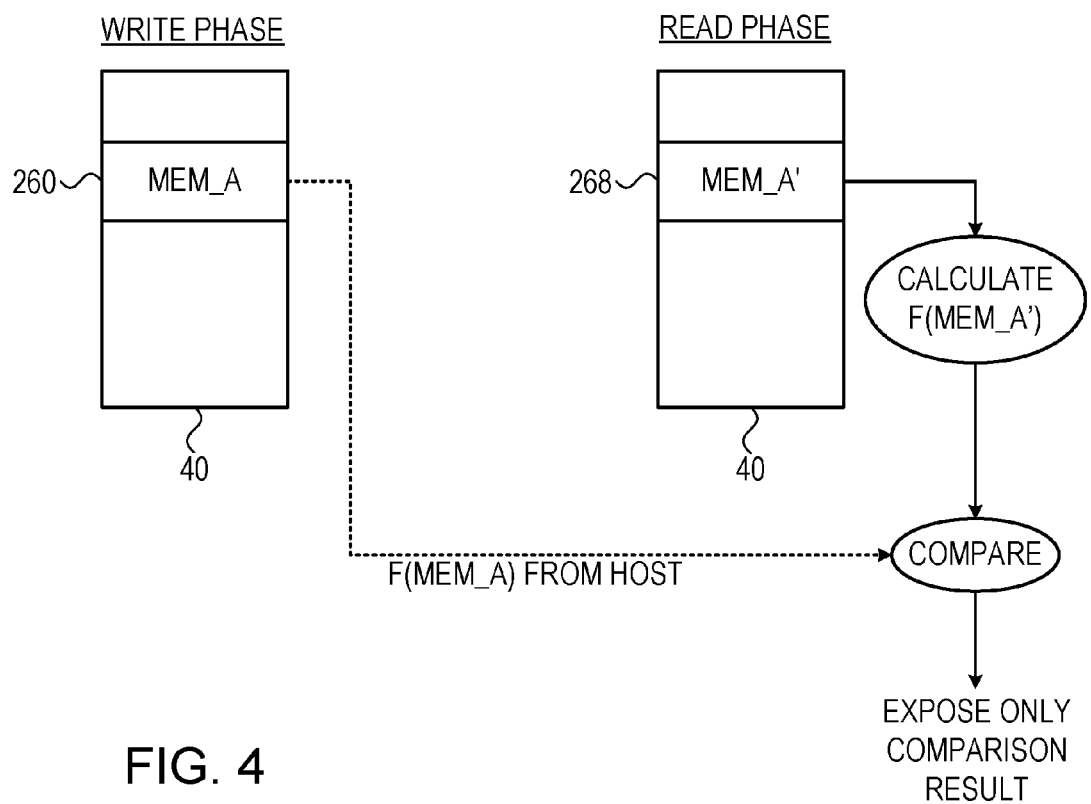
FIG. 4 is a diagram that schematically illustrates a method for testing a memory device using a one-way function, in accordance with an embodiment of the present invention.

FIG. 4 is a diagram that schematically illustrates a method for testing a memory device using a one-way function, in accordance with an embodiment of the present invention. The method of FIG. 4 comprises a write phase and a read phase. In the write phase, the host writes testing data to a memory area 260 in the memory device. We assume that the host possesses an expected result of applying a one-way function over the testing data, and that R/W unit 60 comprises means to calculate the same one-way function over the written data.

The host and R/W unit 60 can use any suitable one-way function F(•) that has the property that given an input A, B=F(A) is easy to calculate, but given the result B, reproducing A is computationally infeasible. Moreover, given two different inputs A and A', the probability that F(A)=F(A') is very low. Example one-way functions include the cryptographic hash functions SHA-1 and SHA-2.

In the read phase, the memory device checks whether any change has occurred to the data stored in memory area MEM_A. the memory area 268, denoted MEM_A', is the same memory area as MEM_A (i.e., comprises the same memory addresses), but the content in area 268 may be different from the original content written in area 260 because of errors.

In some embodiments, to test the integrity of the data in MEM_A, the R/W unit calculates F(MEM_A') and compares the result to the expected result F(MEM_A), which is provided by the host. The host may initiate the read phase immediately after writing the testing data, or at any suitable other occasion. If F(MEM_A') equals F(MEM_A), the data integrity is verified with high probability. R/W unit 60 delivers to host 28 only the binary pass/fail result of the integrity validation test. This testing scheme checks whether the testing data was written correctly by comparing not the data itself, but a signature of the data, while exposing only a binary pass/fail result. Moreover, using a cryptographically strong one-way function makes it infeasible for an attacker to guess the stored content.

An unauthorized attacker may send many different versions of the expected one-way function result, in attempt to discover the correct one. In an embodiment, R/W unit 60 keeps track of the number of such attempts, and if this number exceeds a predefined threshold, the R/W unit takes suitable protective measures, such as disabling the device's test mode.

Secured Test by Erasing Secret Keys

In some embodiments, memory device 24 enables to perform memory testing only when no secret key is installed. In these embodiments, if the memory device is configured to operate in testing mode (e.g., using mode configuration unit 44), but detects that a secret key has been installed, the memory device disables the testing until the entire memory, including the secret key, is erased. Alternatively, it is sufficient for the memory device to allow the testing when just the secret key, and possibly limited memory areas that store sensitive data are erased.

The embodiments of system 20 that are disclosed above are exemplary, and are chosen purely for the sake of conceptual clarity. In alternative testing systems any other suitable embodiments can also be used. For example, although the various embodiments above are described separately, other testing systems can be configured to execute two or more such embodiments simultaneously.

Although the embodiments described herein mainly address secure testing of non-volatile memories, the methods and systems described herein can also be used in other applications, such as in secure testing of storage systems of any size and technology.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   operating a memory device, which comprises a memory and a memory controller that connects the memory to an unsecure link, in accordance with a secure testing mode in which the memory device is allowed to expose on the unsecured link only information from which data stored in the memory cannot be deduced;
   while operating in accordance with the secure testing mode, reading one or more words from the memory using the memory controller;
   calculating using the memory controller a result of a one-way function applied to the one or more words, such that none of the one or more words can be recovered from the result; and
   outputting from the memory device, on the unsecure link, encoded information indicative of errors occurring in the one or more words, based on the calculated result.

2. The method according to claim 1, and comprising receiving from a host, over the unsecure link, an expected result of the one-way function applied to at least a subset of the one or more words when stored, wherein calculating the result comprises applying the one-way function to the subset of the one or more words when read.

3. The method according to claim 2, wherein outputting the encoded information comprises outputting a binary result of a comparison between the expected result and the calculated result.

4. The method according to claim 2, wherein receiving the expected result comprises receiving the expected result a multiple number of times, and if the number of times exceeds a predefined threshold, taking a protective measure.

5. A memory device, comprising:
   a memory; and
   a memory controller, which is configured to connect the memory to an unsecure link and, while operating in accordance with a secure testing mode in which the memory device is allowed to expose on the unsecured link only information from which data stored in the memory cannot be deduced, to read one or more words from the memory, to calculate a result of a one-way function applied to the one or more words such that none of the one or more words can be recovered from the result, and to output on the unsecure link encoded information indicative of errors occurring in the one or more words, based on the calculated result.

6. The memory device according to claim 5, wherein the memory controller is configured to receive from a host, over the unsecure link, an expected result of the one-way function applied to at least a subset of the one or more words when stored, and to calculate the result by applying the one-way function to the subset of the one or more words when read.

7. The memory device according to claim 6, wherein the memory device is configured to output a binary result of a comparison between the expected result and the calculated result.

8. The memory device according to claim 6, wherein the memory controller is configured to receive the expected result a multiple number of times, and if the number of times exceeds a predefined threshold, to take a protective measure.

* * * * *